United States Patent
Youngil Ha et al.

(10) Patent No.: US 7,970,422 B2
(45) Date of Patent: Jun. 28, 2011

(54) SYSTEM AND METHOD FOR FREQUENCY PLANNING

(75) Inventors: Michael Youngil Ha, McLean, VA (US); Chris Helzer, Bethesda, MD (US); Douglas A. Hyslop, Vienna, VA (US); Salman Yusuf, Lorton, VA (US)

(73) Assignee: Nextel Communications Inc., Reston, VA (US)

( * ) Notice: Subject to any disclaimer, the term of this patent is extended or adjusted under 35 U.S.C. 154(b) by 997 days.

(21) Appl. No.: 11/199,994

(22) Filed: Aug. 10, 2005

(65) Prior Publication Data

US 2006/0052123 A1 Mar. 9, 2006

Related U.S. Application Data

(60) Provisional application No. 60/600,439, filed on Aug. 11, 2004.

(51) Int. Cl.
*H04Q 7/20* (2006.01)
(52) U.S. Cl. .......................................... 455/509; 455/450
(58) Field of Classification Search ................. 455/509, 455/446, 447, 450, 515
See application file for complete search history.

(56) References Cited

U.S. PATENT DOCUMENTS

| | | | | |
|---|---|---|---|---|
| 3,906,166 | A | * | 9/1975 | Cooper et al. ................. 455/437 |
| 6,088,341 | A | * | 7/2000 | Hinedi et al. ................. 370/319 |
| 6,580,912 | B2 | * | 6/2003 | Leung et al. ................. 455/447 |
| 6,584,305 | B1 | | 6/2003 | Ohta et al. |
| 2002/0191710 | A1 | * | 12/2002 | Jeckeln et al. ................. 375/296 |

OTHER PUBLICATIONS

International Search Report for PCT/US05/28297 dated Jan. 25, 2006.
Written Opinion of the International Search Authority dated Jan. 25, 2006.

* cited by examiner

*Primary Examiner* — CongVan Tran

(57) ABSTRACT

A system and method for frequency planning is provided. In systems with consecutive frequency channels, half-channel frequency reuse can be provided between channels employed by different cells. Specifically, two channels in two proximately located cells can overlap within the frequency spectrum by one-half of the frequency of a channel. Half-channel overlap can increase frequency reuse, and in turn, system capacity.

10 Claims, 6 Drawing Sheets

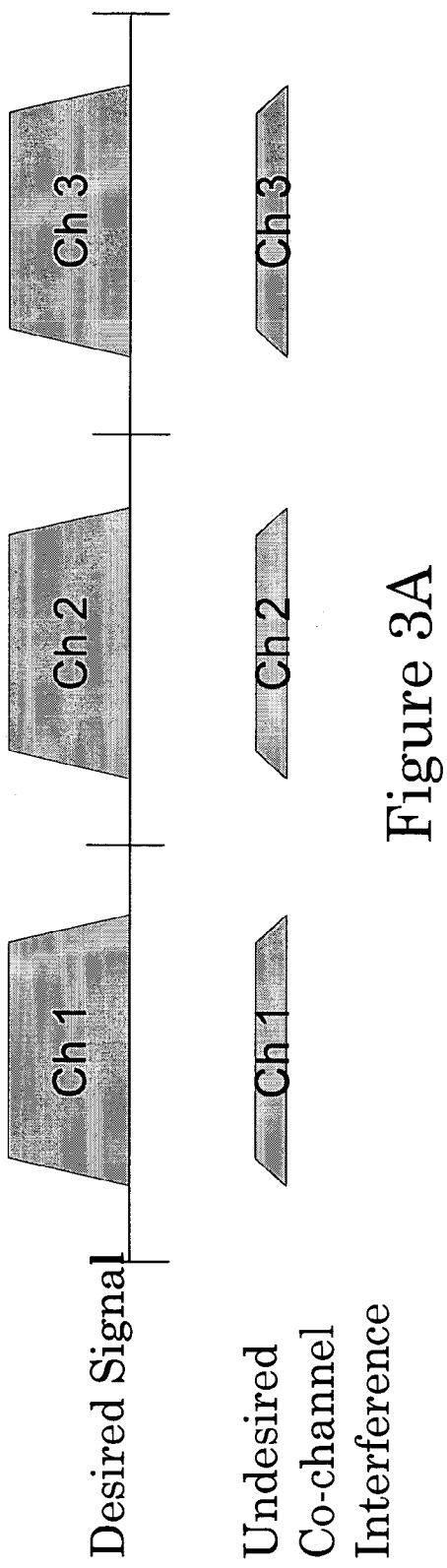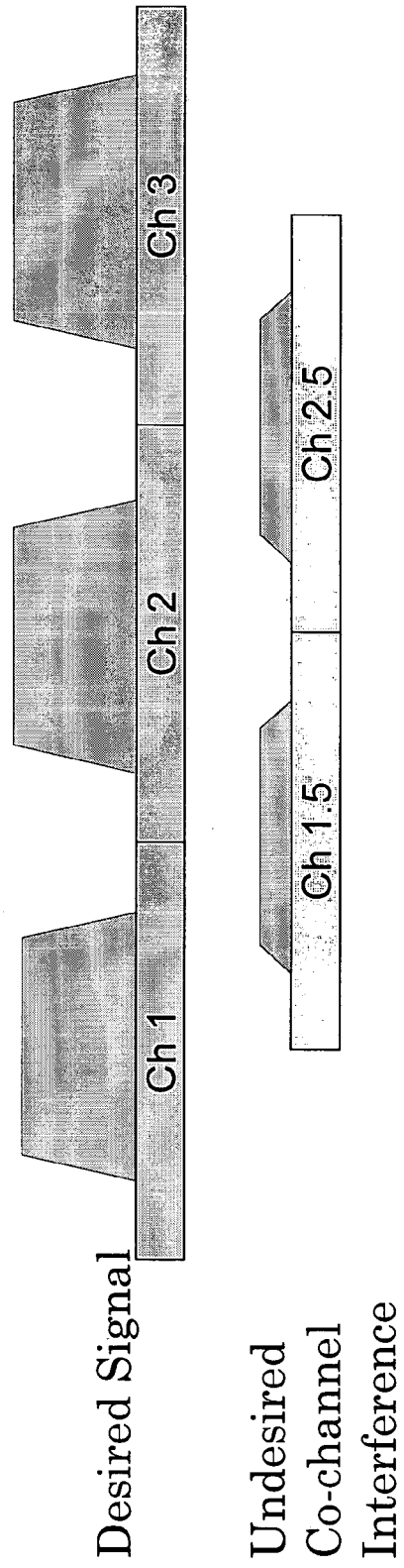
Figure 3A
Figure 3B

SYSTEM AND METHOD FOR FREQUENCY PLANNING

CROSS-REFERENCE TO RELATED APPLICATIONS

This application claims the benefit of U.S. Provisional Application No. 60/600,439, filed Aug. 11, 2004, the entire disclosure of this application is herein expressly incorporated by reference.

BACKGROUND OF THE INVENTION

Frequency reuse is a conventional technique for increasing wireless system capacity while reducing inter-cell interference. FIG. 1 illustrates a conventional N=3 frequency reuse pattern where the distance separation between co-channel base stations is always maintained at 3R, where R is the radius of a cell.

Some commercial mobile radio service (CMRS) systems, such as the iDEN system owned and operated by Nextel Communications, Inc., of Reston Va., currently operate within the 800 and 900 MHz frequency bands, a frequency spectrum known as Specialized Mobile Radio (SMR). In the SMR frequency spectrum, channels are interleaved and ownership of channels may change in 25 kHz increments. Therefore, CMRS system operators who operate in the SMR frequency spectrum use 25 kHz channel spacing for frequency reuse cell planning. The 25 kHz channel spacing is due to FCC requirements for masking certain emissions outside of authorized channels. Accordingly, 25 kHz channel spacing is the only option for frequency planning for CMRS system operators who currently operate iDEN system within the SMR spectrum.

FIG. 2 illustrates an exemplary frequency channel. As illustrated in FIG. 2, the 25 kHz channel comprises four sub-carriers and two 3–4 kHz guard bands. The two guard bands allow for compliance with the FCC rule that CMRS system operators who operate within the SMR frequency spectrum provide a sufficient rejection at the channel edge to protect against interference to adjacent channel licensees.

The FCC has released a Report and Order on 800 MHz SMR realignment to improve public safety communications and mitigate the potential harmful interference to public safety. By this Report and Order, public safety systems will be relocated to a lower portion of the 800 MHz and SMR band, and CMRS system operators will occupy contiguous 7+7 MHz of spectrum in the upper portion of the band. The nationwide contiguous spectrum position could provide more flexibility in frequency planning.

SUMMARY OF THE INVENTION

A system and method for frequency planning is provided. Frequency reuse is implemented in a CMRS system using half-channel offsets. Specifically, a first cell communicates with mobile stations using a first frequency channel and a second cell communicates with mobile stations using a second frequency channel. The first and second frequency channels are offset with respect to each other by a frequency spacing that is one-half of the size of the first frequency channel. For example, assuming the first frequency channel is located at a frequency band of 863.0125–863.0375 MHz, the second frequency channel can be located at a frequency band of 863.025–863.05 MHz. The first and second cells can be located geographically adjacent to each other. Alternatively, a third cell can be located geographically between the first and second cells.

Other objects, advantages and novel features of the present invention will become apparent from the following detailed description of the invention when considered in conjunction with the accompanying drawings.

BRIEF DESCRIPTION OF THE DRAWINGS

FIG. 3A illustrates co-channel interference of a conventional frequency reuse pattern;

FIG. 3B illustrates co-channel interference of an exemplary half-channel frequency reuse pattern, in accordance with the present invention;

DETAILED DESCRIPTION OF THE EXEMPLARY EMBODIMENTS

The FCC rebanding of the 800 MHz SMR band will result in contiguous 7+7 MHz of spectrum in the upper portion of the SMR band. The spectrum reallocation will result in the FCC's emissions mask requirements outside of authorized channels applying only to both ends of the contiguous spectrum. Accordingly, the SMR rebanding will allow CMRS system operators with frequencies in the 800 MHz spectrum to perform frequency planning in 12.5 kHz of channel spacing. As will be described herein, this frequency planning can increase spectral efficiency, and hence, enhance system capacity.

Current frequency planning is performed based on the assumption that every cell site is using channels in multiples of 25 kHz so that the same channel is not repeated within a certain distance in order to minimize the co-channel interference. Although iDEN systems currently employ channels in multiples of 25 kHz, iDEN infrastructure and handsets are currently capable of tuning in multiples of 12.5 kHz in order to support various domestic and international markets. In the present invention, frequency planning can be performed in multiples of 12.5 kHz such that greater frequency utilization is achieved.

Figure 1:
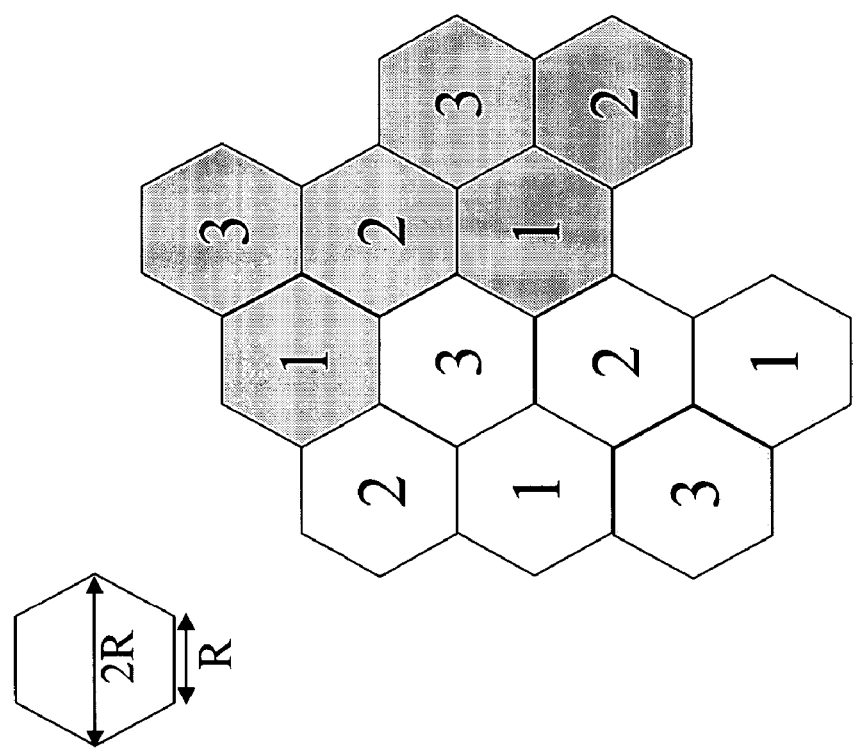
FIG. 1 illustrates a conventional frequency reuse pattern.
Figure 2:
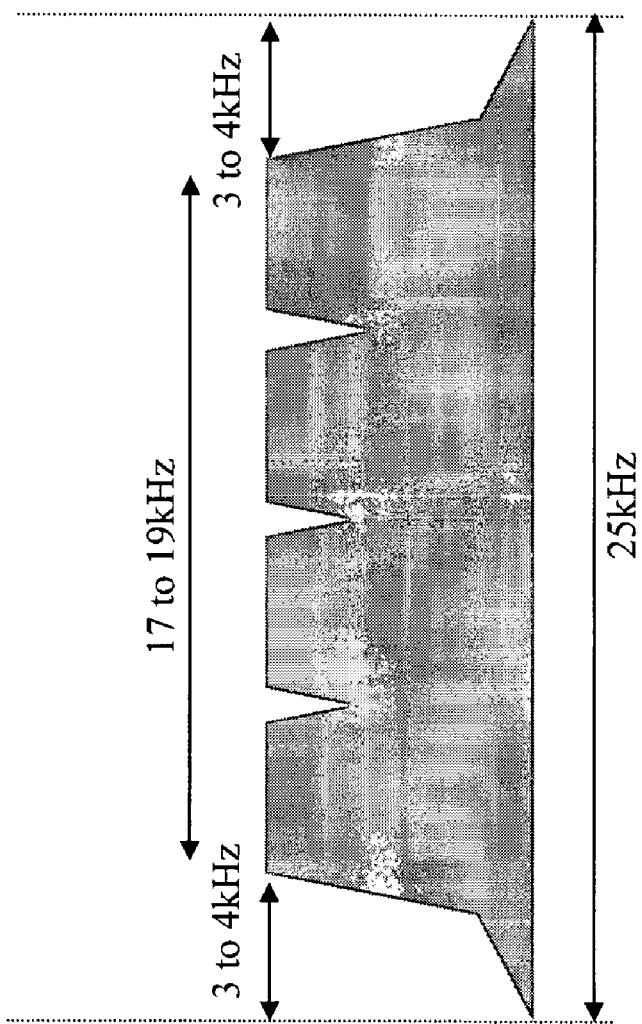
FIG. 2 illustrates an exemplary 25 kHz channel.
Figure 3C:
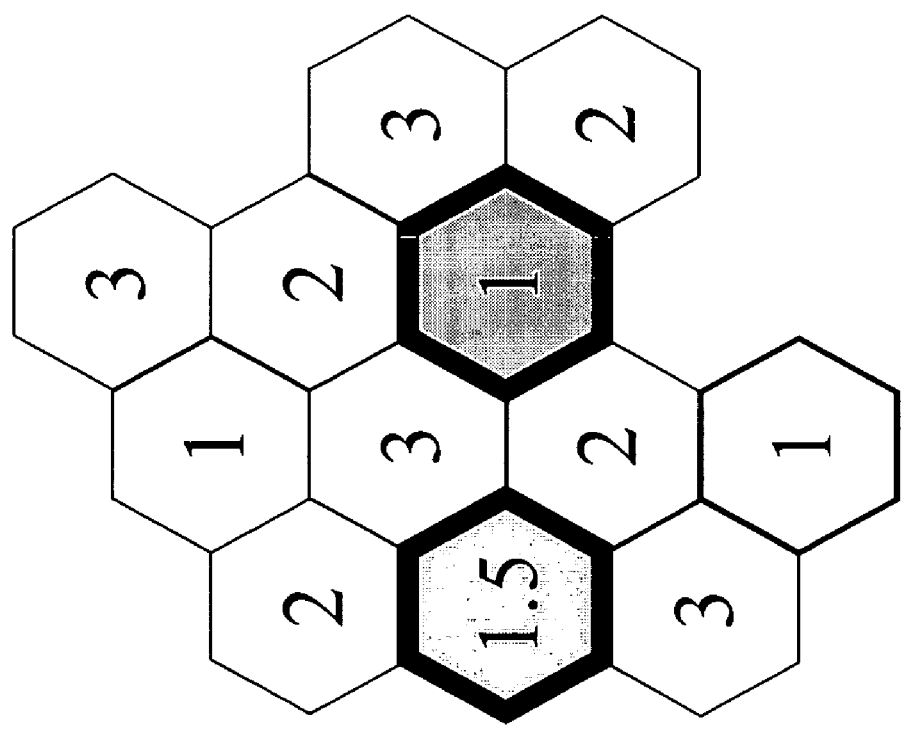
FIG. 3C illustrates an exemplary half-channel frequency reuse pattern corresponding to FIG. 3B.

FIG. 3A illustrates co-channel interference of a conventional frequency reuse pattern. As illustrated in FIG. 3A, the co-channel interference coincides with the desired signals in the various channels. By contrast, FIG. 3B illustrates co-channel interference of a half-channel frequency reuse pattern, in accordance with an exemplary embodiment of the present invention, in which one cell can use channel 1, while another proximately located cell can use channel 1.5. For example, channel 1 can be within a frequency band of 863.0125–863.0375 MHz, while channel 1.5 can be within the frequency band of 863.025–863.05 MHz. As illustrated in FIG. 3B, this results in a half-channel frequency overlap between the two cells. FIG. 3C illustrates a cell layout corresponding to the exemplary frequency reuse pattern illustrated in FIG. 3B.

Figure 4:
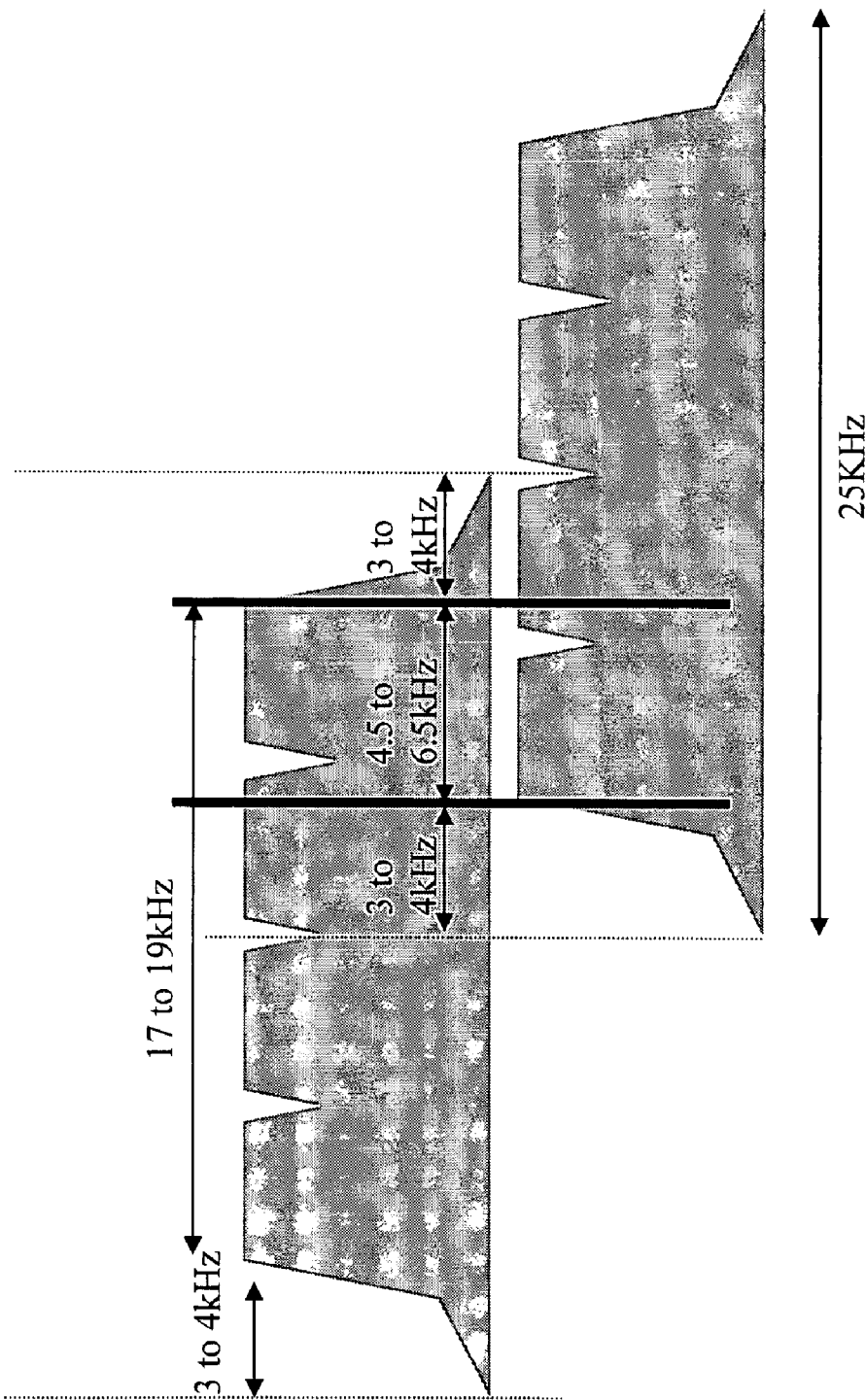
FIG. 4 illustrates two exemplary 25 kHz carriers in a half-channel frequency offset.

FIG. 4 illustrates the half-channel overlap in more detail. Although the half-channel spacing results in a 50% overlap between the two channels, due to the guard band, the actual co-channel interference is only 22%. Specifically, the co-channel interference is approximately 5.5 kHz/25 kHz. This results in a capacity gain for the network without a large increase in co-channel interference. Moreover, because channel coding is applied on all four sub-carriers, there will be an interference averaging effect such that a potential increase in the bit error rate (BER) is spread across all users.

Figure 5:
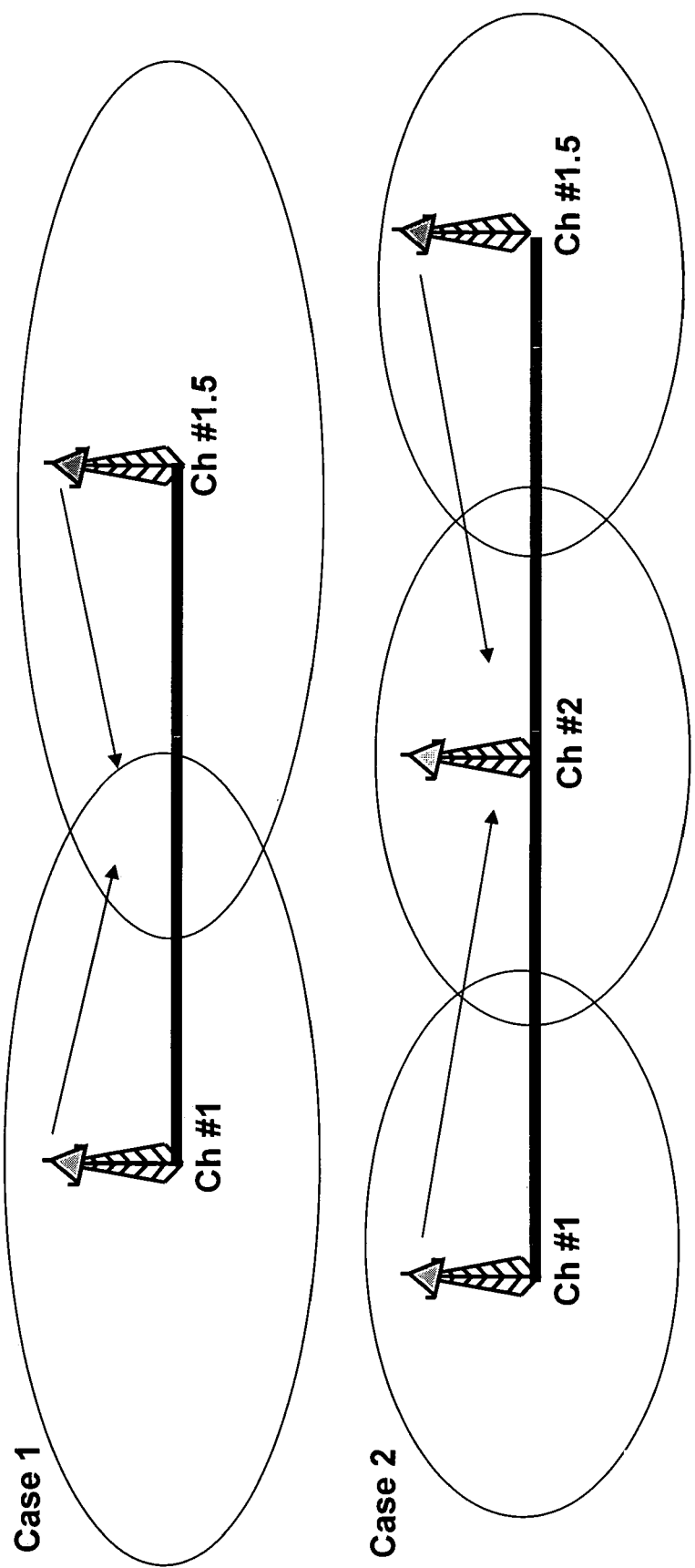
FIG. 5 illustrates exemplary half-channel frequency reuse patterns.

FIG. 5 illustrates two different half-channel spacing cases. In the first case, a cell operating on channel 1 is located adjacent to a cell operating on channel 1.5. The second case employs a cell operating on channel 2 located between cells operating on channels 1 and 1.5. Co-channel interference in the first case will be greater than in the second case due to the proximity of the half-channel overlapping cells. However, the frequency reuse of the first case may produce acceptable levels of co-channel interference and may result in an increased system capacity compared to the second case.

Although the present invention has been described in connection with the SMR frequency spectrum and iDEN systems, the present invention is equally applicable to other frequency spectrums with contiguous channels and other CMRS systems. Moreover, although channels have been described as having 25 kHz frequency bands, the present invention is equally applicable to channels having other values for frequency bands.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for frequency planning in a wireless cell network, the method comprising the acts of:

assigning, by a frequency spacing device, a first frequency channel to a first cell; and assigning, by the frequency spacing device, a second frequency channel to a second cell, wherein the second frequency channel is offset from the first frequency channel by one-half of the first frequency channel;

wherein the offset is 12.5 kHz and the first and second cells are located geographically adjacent to each other.

2. The method of claim 1, further comprising assigning, by the frequency spacing device, a third frequency channel to a third cell located geographically between the first and second cells.

3. The method of claim 1, wherein each of the first and second frequency channels has a bandwidth of 25 kHz.

4. The method of claim 1, wherein each of the first and second frequency channels comprises two guard bands between 3 and 4 kHz.

5. The method of claim 2, wherein each of the first, second, and third frequency channels has a bandwidth of 25 kHz.

6. A wireless network system, comprising:

a first cell which wirelessly communicates with mobile stations using a first frequency channel; and a second cell which wirelessly communicates with mobile stations using a second frequency channel, wherein the first frequency channel is offset from the second frequency channel by one-half of the first frequency channel;

wherein the offset is 12.5 kHz and the first and second cells are located geographically adjacent to each other.

7. The system of claim 6, further comprising a third cell located geographically between the first and second cells, wherein the third cell communicates with mobile stations using a third frequency channel.

8. The system of claim 6, wherein each of the first and second frequency channels has a bandwidth of 25 kHz.

9. The system of claim 6, wherein each of the first and second frequency channels comprises two guard bands between 3 and 4 kHz.

10. The system of claim 7, wherein each of the first, second, and third frequency channels has a bandwidth of 25 kHz.

* * * * *